United States Patent [19]
Leonard et al.
[11] 4,099,635
[45] Jul. 11, 1978

[54] GONDOLA CAR LOADER

[75] Inventors: Thomas E. Leonard, Evergreen; Walter E. Buckner, Hartselle, both of Ala.

[73] Assignee: Lucky Manufacturing Company, Huntsville, Ala.

[21] Appl. No.: 739,283

[22] Filed: Nov. 5, 1976

[51] Int. Cl.[2] ............ B65G 67/26
[52] U.S. Cl. ............ 214/152; 214/38 CC
[58] Field of Search ............ 214/38 CA, 38 C, 38 CC, 214/40, 41, 57, 44 R, 44 A; 180/9.32, 9.34, 22, 8 C, 15, 16, 24.02

[56] References Cited

U.S. PATENT DOCUMENTS

| | | | |
|---|---|---|---|
| 1,368,081 | 2/1921 | Webb | 214/44 A X |
| 1,918,419 | 7/1933 | Needham | 214/38 CA X |
| 2,801,014 | 7/1957 | Colson | 214/44 A X |
| 3,057,319 | 10/1962 | Wagner | 180/9.32 X |
| 3,191,961 | 6/1965 | Brennan et al. | 180/24.02 X |

FOREIGN PATENT DOCUMENTS

| | | | |
|---|---|---|---|
| 252,815 | 10/1912 | Fed. Rep. of Germany | 180/9.32 |
| 147,449 | 6/1921 | United Kingdom | 180/9.32 |

*Primary Examiner*—Albert J. Makay
*Attorney, Agent, or Firm*—Burns, Doane, Swecker & Mathis

[57] ABSTRACT

A gondola car loader includes a wheeled chassis moveable along the top edges of adjacent gondola cars in a direction of the railroad track on which the cars are located. Wheeled spanning legs, pivotably mounted to the chassis, are adapted to span gaps between adjacent cars and support the chassis as it is moved across the gaps. A knuckle boom, for loading and unloading cargo from the cars, is rotatably mounted on the chassis.

2 Claims, 3 Drawing Figures

GONDOLA CAR LOADER

BACKGROUND OF THE INVENTION

Railroad gondola cars are widely used to transport a variety of cargos. Several techniques are known for loading and unloading the cargos.

Gondola cars may be loaded and unloading by hoists, cranes or conveyors which are stationarily mounted with respect to railroad tracks on which the gondola cars run. This arrangement requires that each gondola car be sequentially positioned sufficiently close to the stationary loader to permit the loader to reach the car. Where a coupled line of gondola cars is to be loaded or unloaded, the line of cars may have to be moved each time one or a few cars have been unloaded in order that the loader may reach additional cars. This requires that a traction engine be periodically operated throughout the loading or unloading of a line of cars.

Accordingly, it is an object of the present invention to provide a gondola car loader which is moveable with respect to a stationary line of gondola cars.

Gondola cars may be loaded and unloaded by mobile loaders which travel along the ground adjacent to a line of gondola cars. This loading technique has a disadvantage in that the mobile loader must be provided with a right of way paralleling railroad tracks on which gondola cars run.

It is another object of the present invention to provide a gondola car loader, moveable with respect to stationary gondola cars, which does not require a right of way adjacent to the railroad track on which the gondola cars are run.

A known method of loading ore cars, illustrated in U.S. Pat. No. 2,906,212 to Hayes, employs specially designed ore cars providing a runway on their top faces on which a loader vehicle may be driven. The loader vehicle is equipped with track laying wheels.

The loader is not, however, adapted for use on conventional gondola cars since the tops of conventional gondola cars do not form nearly continuous runways when the cars are adjacent one another on a railroad track.

Accordingly, it is yet another object of the present invention to provide a loader for conventional gondola cars which is moveable across the tops of adjacent gondola cars without modification of the cars to provide a nearly continuous runway across the tops of the cars.

An apparatus moveable along the top edges of adjacent gondola cars is shown in a later filed U.S. Patent Application (Ser. No. 789,887, filed Apr. 22, 1977) which application is assigned to the same assignee as the subject application.

These and other objects of the invention will become apparent from the claims and from the following description when read in conjunction with the appended drawings.

THE DRAWINGS

DETAILED DESCRIPTION

The present invention relates to a means and method for moving a wheeled apparatus along the upper edges of generally lateral parallel walls of adjacent, open topped cars with gaps therebetween. One embodiment the present invention, shown in FIG. 1, comprises an apparatus for loading and unloading gondola railroad cars positioned adjacent one another on a railroad track. The gondola car loader may include a wheeled chassis moveable along top edges of adjacent gondola cars in a direction of the railraod track on which the cars are located. Spanning legs, pivotably mounted to the chassis, may be adapted to span gaps between adjacent cars and support the chassis as it is moved across the gaps between the cars. A hoist, crane, conveyor, or other suitable loading and unloading means may be carried by the chassis.

Figure 1:
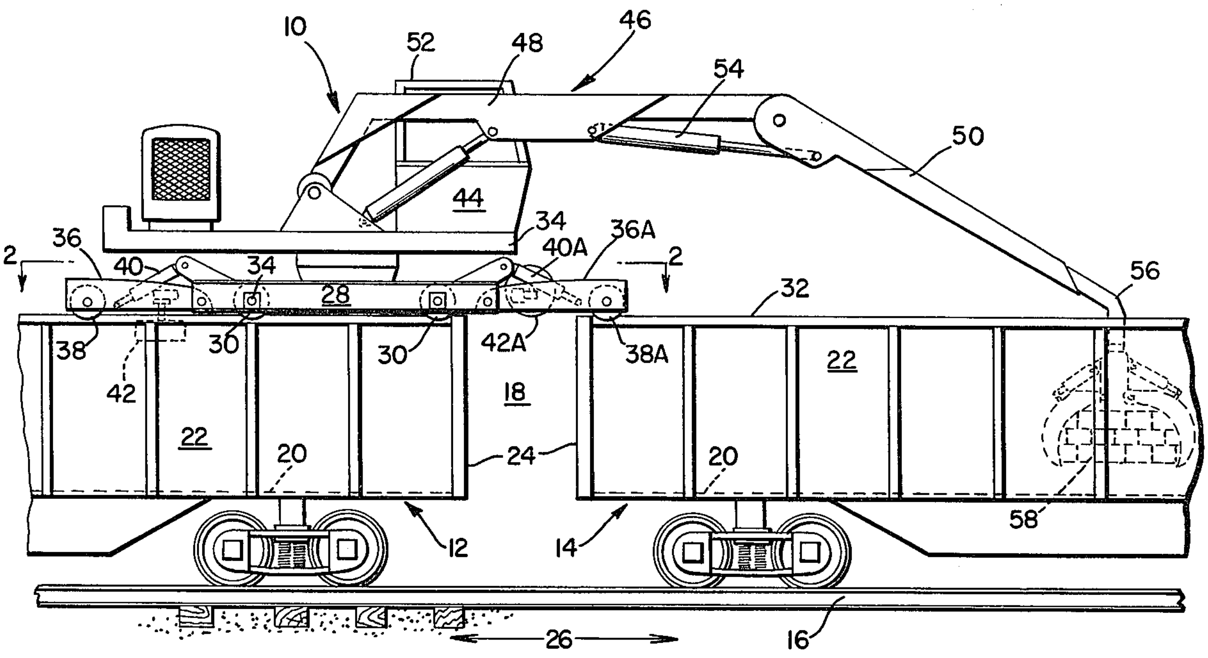
FIG. 1 is a side view of an embodiment of the present invention positioned on adjacent gondola cars.

With reference to FIG. 1, a gondola car loader 10 is shown positioned on two adjacent conventional gondola cars 12 and 14. The gondola cars 12 and 14 are located on railroad track 16. The cars are separated by a gap 18 which is at least the length of the coupling mechanism of the cars. The bodies of cars 12 and 14 include cargo beds 20, surrounded on four sides by vertical walls. Vertical side walls 22 of the cars are generally parallel to the railroad track 16. Vertical end walls 24 of the cars are generally perpendicular to the foward and reverse directions of motion (arrow 26) of the cars along the railroad track 16.

The gondola car loader includes a chassis 28, carrying wheels 30. The wheels 30 are shown engaging an upper edge portion 32 of the vertical side walls 22 of the gondola car 12. The wheels 30 may be flanged to facilitate guiding the loader in the directions of arrows 26. Motors 34 may be provided to drive wheels 30 to propel the loader across the tops of the gondola cars. Alternatively, a single motor may be employed to drive the wheels 30 and to power hydraulic mechanisms associated with the loader.

Spanning legs 36 and 36A may be pivotably mounted to the chassis 28 at opposite ends thereof. The spanning legs 36 and 36A may carry flanged wheels 38 and 38A, respectively, which wheels are adapted to engage upper edge portions 32 of the side walls 22 of the gondola cars. In one configuration, the wheels 38 and 38A may be flanged at both axial ends thereof to facilitate guiding the loader in the directions of arrow 26. Hydraulic cylinders 40 and 40A, operatively connected to the spanning legs 36 and 36A respectively, may be provided to selectively pivot the spanning legs to bridge gaps such as gap 18 between adjacent cars. The spanning legs 36 and 36A and their associated wheels 38 and 38A may be operative to guide and support the chassis 28 as it is driven across the gaps between adjacent cars. Rotatable tires 42 and 42A, pivotably mounted to the chassis 28, may be provided to selectively engage the inner sides of walls 22 of the cars to guide the loader and inhibit movement of the loader in a horizontal direction perpendicular to the railroad track 16. Alternatively, the four spanning legs may be provided, each carrying a wheel located generally beneath the loader at one end of the leg and a spanning wheel at the other end of the leg. (Configuration not shown). Each such leg may be pivoted about an axis located between the wheels by hydraulic actuation, whereby the ends of the legs may be rocked upward and downwardly to walk the loader across the gaps between the cars.

Means 44 for engaging and moving cargo may be rotatbly mounted on chassis 28. This means may be a knuckle boom loader 46 as shown in FIG. 1. The knuckle boom loader may include pivotably engaged arms 48 and 50, selectively positionable by means of hydraulic cylinders 52 and 54. Hydraulically actuated grasping means 56 may be provided at the end of knuckle boom 46 for selectively engaging cargo 58.

In operation, loader 10 may be positioned entirely atop a single gondola car and employed to load and unload cargo within the reach of the knuckle boom 46. When it becomes necessary to move the loader 10 to a new position so that boom 46 may reach or move cargo, the loader may be driven along the tops of the gondola cars and across the gaps therebetween. This movement of the loader 10 may be accomplished in the following way. The loader may be driven in a direction parallel to the railroad track 16 along the tops of the gondola cars, with direction, for purposes of this discussion, will be assumed to be toward the right with respect to FIG. 1. When the wheel 38A of the right spanning leg 38A reaches the vertical wall 24 of the gondola car 12, which is perpendicular to the direction of motion of the loader, the hydraulic cylinder 40A may be actuated to pivot the spanning leg 36A to disengage wheel 38A from the car 12. The right guide tire 42A may be pivoted upward into the chassis to prevent the tire from contacting wall 24 of the car. The loader may be driven a suitable further distance until the wheel 38A has crossed the gap between the cars and is located over the next adjacent car. Subsequently, the spanning leg 36A may be lowered and guided as necessary to engage wheel 38A with the upper edge portion 32 of the gondola car 14 whereupon the spanning leg 36A may be employed to support an end of the loader so that the chassis 28 may be driven across the gap 18.

Figure 2:
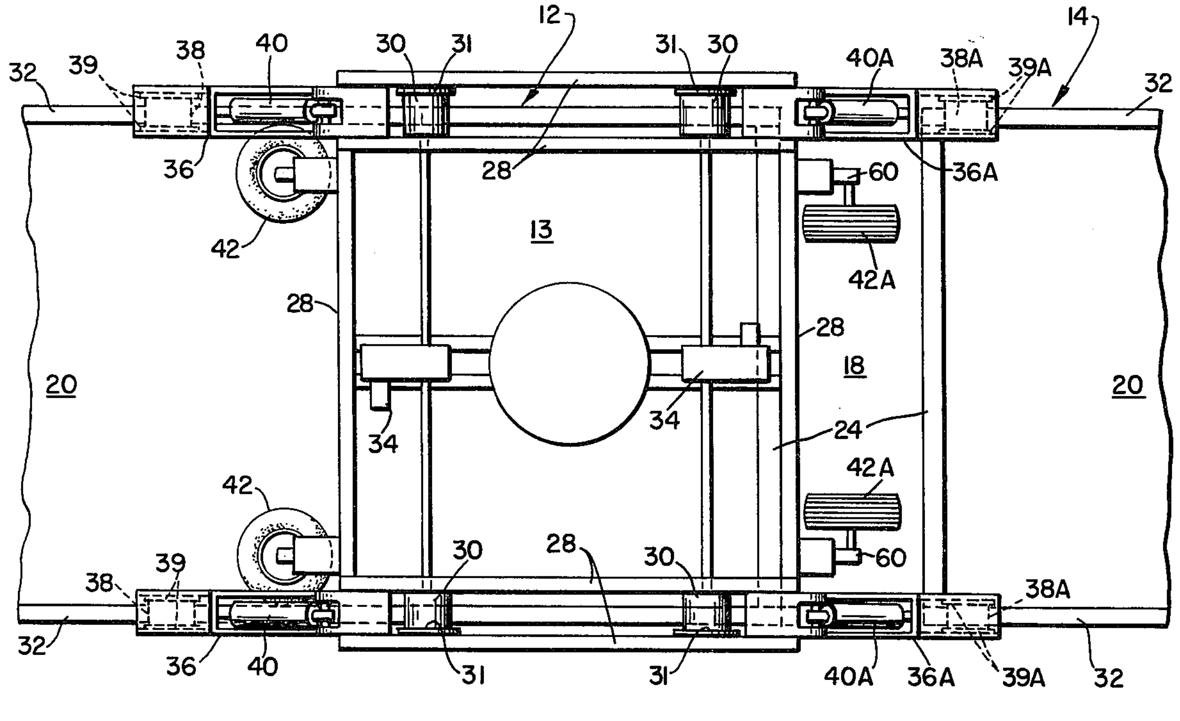
FIG. 2 is a plan cross-sectional view of the embodiment of FIG. 1 taken along line 2—2.

Referring now to FIG. 2, a cross-sectional plan view of the gondola car loader is shown taken along line 2—2 of FIG. 1. The chassis 28 is shown positioned on gondola car 12 having a cargo bed 13. The chassis 28 may be supported on upper edge portions 32 of the gondola car 12 by means of the wheels 30. The wheels 30 may be provided with flanges 31 at their outer axial ends. The wheels 30 may be driven by the motors 34. Wheels 38 and 38A may be carried by the spanning legs 36 and 36A. Advantageously, the wheels 38 and 38A may each be provided with flanges 39 at both axial ends to guide the wheels along the upper edge portions 32 of the lateral walls of the cars. In FIG. 2 wheels 38A engage the upper edge portions 32 of vertical walls of the gondola car 14. In this configuration, the spanning legs 36A bridge the gap 18 between the gondola cars 12 and 14. The guide tires 42A may be pivoted inwardly and upwardly around axes 60 in order that the guide tires may clear the vertical walls 24 of the gondola cars which are perpendicular to the direction of travel of the loader. Guide tires 42 may be oriented to engage the vertical lateral wall of the gondola car 12, to guide the loader in a direction parallel to the lateral walls.

Figure 3:
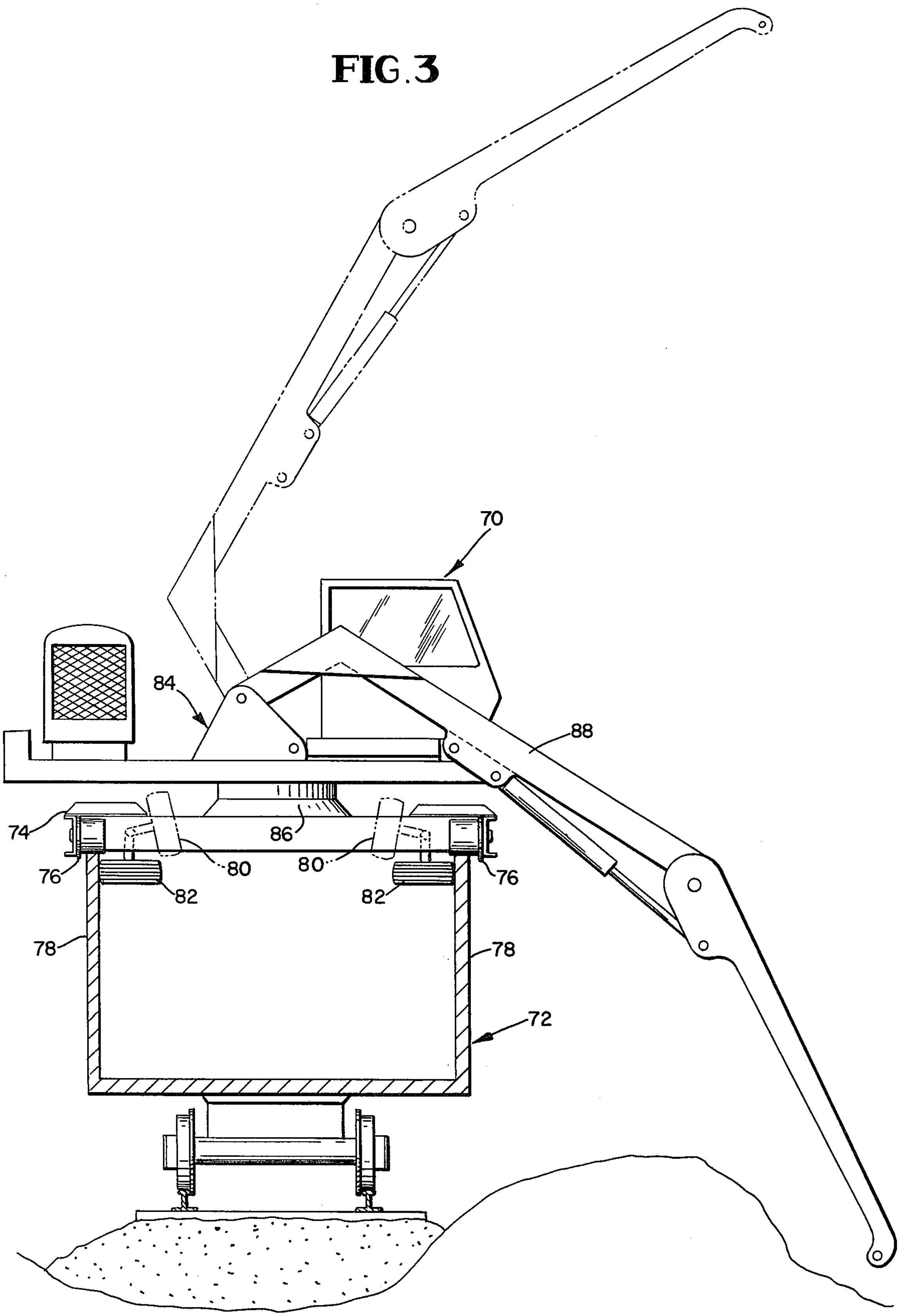
FIG. 3 is a front cross-sectional view of an embodiment of the present invention positioned on a gondola car.

FIG. 3 is a front cross-sectional view of a gondola car loader 70 positioned on a gondola car 72. A chassis 74 is rotatably supported on the gondola car by flanged wheels 76 which engage vertical lateral walls 78 of the gondola car 72. Pivotable guide tires (shown in phantom) are depicted in two positions 80 and 82. In position 80, the guide tires are pivoted upwardly into the chassis of the loader to avoid vertical walls of the gondola car and other obstructions within the gondola car. In position 82, the guide tires are shown pivoted downwardly to roll along the vertical lateral walls 78 of the gondola car thereby guiding the loader for motion in a direction parallel to the lateral walls 78.

A device for engaging and moving cargo 84 may be mounted on chassis 76 for rotation about axis 86. The device for engaging and moving cargo may include a knuckle boom 88. The knuckle boom 88 may be dimensioned and located to permit it to reach cargo within the gondola car 72, within adjacent gondola cars, and/or on the ground along the railroad right of way.

The principals, preferred embodiments, and modes of operation of the present invention have beeen described in the foregoing specification. The invention which is intended to be protected is not, however, to be construed as limited to the particular forms disclosed since these are to be regarded as illustrative rather than restrictive. Variations and changes may be made by those skilled in the art without departing from the spirit and scope of the present invention.

What is claimed is:

1. A method for moving a wheeled vehicle along the upper edges of generally parallel lateral walls of adjacent, conventional open-topped gondola cars with gaps therebetween, comprising the steps of:

positioning the vehicle so that wheels of the vehicle are supported on the upper edges of generally parallel lateral walls of a first open-topped car;

spanning a gap between the first car and an adjacent second open-topped car by pivoting a first, forward spanning leg, pivotably mounted to a forward portion of the chassis of the vehicle, in a generally vertical plane so that a leading wheel carried by said leg engages an upper edge of a vertical wall of the second car thereby exerting a downward force so that the vehicle is partially supported on the second car by means of the spanning leg to permit at least one wheel of the vehicle to disengage the first car;

driving the vehicle forward whereby a rear portion of the vehicle approaches the gap between the first and second cars;

pivoting a second, rearward spanning leg, pivotably mounted to a rearward portion of the vehicle, in a generally vertical plane so that the vehicle is partially supported by a trailing wheel carried by the second spanning leg to permit at least another wheel of the vehicle to disengage from the first car;

driving the vehicle forward; and, pivoting the second spanning leg so that the vehicle is out of contact with the first car and entirely supported on the second car.

2. A method for moving a wheeled vehicle having a chassis along the upper edges of generally parallel lateral walls of adjacent, open-topped cars with gaps therebetween, comprising the steps of:

positioning the vehicle so that wheels of the vehicle are supported on the upper edges of generally parallel lateral walls of a first open-topped car;

pivoting a first forward member, pivotably mounted to a forward portion of the chassis and having a leading wheel, so that the leading wheel disengages the first car;

moving the vehicle forward until the leading wheel is positioned over a lateral wall of a second car;

pivoting the first member in a substantially vertical plane so that the leading wheel engage the lateral wall of the second car to apply a downward force whereby the vehicle is partially supported on the second car;

moving the vehicle forward whereby a rear portion of the vehicle approaches the gap between the first and second cars;

pivoting a second rearward member, pivotably mounted to a rearward portion of the chassis and having a trailing wheel, so that the vehicle is partially supported on the trailing wheel;

moving the vehicle forward;

pivoting the second member so that the vehicle is supported on the second car; and moving the vehicle along the lateral walls of the second car.

* * * * *